United States Patent [19]
Gelsinger et al.

[11] Patent Number: 5,892,511
[45] Date of Patent: *Apr. 6, 1999

[54] METHOD FOR ASSISTING WINDOW SELECTION IN A GRAPHICAL USER INTERFACE

[75] Inventors: Patrick P. Gelsinger, Beaverton; Rune A. Skarbo, Hillsboro; Christopher C. Lawless, Forest Grove, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 723,574

[22] Filed: Sep. 30, 1996

[51] Int. Cl.$^6$ .................................................. G06F 3/14
[52] U.S. Cl. ........................ 345/340; 345/345; 345/356
[58] Field of Search .................... 345/345, 343, 345/113, 340, 339

[56] References Cited

U.S. PATENT DOCUMENTS

| | | | |
|---|---|---|---|
| 5,179,655 | 1/1993 | Noguchi et al. | 345/345 |
| 5,265,202 | 11/1993 | Krueger et al. | 345/345 |
| 5,283,560 | 2/1994 | Bartlett | 345/113 |
| 5,390,295 | 2/1995 | Bates et al. | 345/342 |
| 5,590,265 | 12/1996 | Nakazawa | 345/340 |
| 5,617,114 | 4/1997 | Bier et al. | 345/113 |
| 5,764,229 | 6/1998 | Bennelt | 345/345 |

OTHER PUBLICATIONS

IBM Technical Disclosure Bulletin, vol. 36, No. 06A, Jun. 1993.

Primary Examiner—Raymond J. Bayerl
Assistant Examiner—Chadwick A. Jackson
Attorney, Agent, or Firm—Blakely, Sokoloff, Taylor & Zafman LLP

[57] ABSTRACT

A method for assisting window selection in a graphical user interface determines one or more current top-level windows to be displayed to a user for selection by the user. The user is then able to select a particular window of the one or more windows being displayed. In some embodiments, the one or more current top-level windows are displayed as translucent windows. Additionally, in some embodiments, a user is able to cycle through multiple sets of one or more windows in order to locate a particular window.

12 Claims, 10 Drawing Sheets

METHOD FOR ASSISTING WINDOW SELECTION IN A GRAPHICAL USER INTERFACE

BACKGROUND OF THE INVENTION

1. Field of the Invention

The present invention pertains to computer systems with graphical user interfaces. More particularly, this invention relates to assisting window selection in a graphical user interface.

2. Background

Computer technology is continuously advancing, resulting in modem computer systems which provide ever-increasing performance. One result of this increased performance is an increased use of computer systems by individuals in a wide variety of business, academic and personal pursuits. The increased performance of computer systems, as well as reduced cost for certain hardware components (such as processors and memory chips), has allowed individual computer systems to execute multiple applications concurrently. "Windows" or "windowing" refers to a technique in which one or more of these multiple applications can be displayed to a user concurrently using portions of a display device. Each of these multiple applications may also have multiple document windows displayed on the display device of the computer system.

The benefits of concurrent display of multiple windows on a display device are numerous. Among these benefits is the ability of the computer system user to substantially simultaneously view data from different applications (or different aspects of one or more applications). For example, an individual may have windows displayed which correspond to a word processing document, a spreadsheet document, and a video conference in progress.

One problem with multiple-window displays, however, is that displaying a large number of windows concurrently may confuse the user. When a large number of windows are displayed concurrently, it is often difficult for a user to locate and activate a particular window, or indeed even remember if a particular window is currently open (for example, a window may be opened but covered by one or more other open windows). Displaying a large number of windows may lead to confusion and/or frustration for the user, especially in real-time applications such as audio, video, and/or data conferencing. Thus, it would be beneficial to provide a method to simplify locating and activating windows in a multiple-window display.

One solution to this problem is to provide a list of current windows, including, for example, both open and minimized windows. For example, the Windows™ 95 operating system includes a TaskBar, typically along the bottom of the screen, which lists the current windows. The Windows™ 95 TaskBar displays the name and/or icon for each current window. However, these names and/or icons may not be recognized by the user. Furthermore, the names of current windows are often truncated in the Windows™ 95 TaskBar, especially when there are a large number of windows. This truncation may lead to even further confusion on the part of the user in locating a particular window.

Another solution to the problem of locating windows in a multiple-window display is to allow the user to cycle through one or more dialog boxes with the icons and/or names of the current windows. For example, in the Windows™ 3.1 operating system, a user can cycle through dialog boxes, each of which provides an icon and name of a currently executing application, by depressing and holding the Alt key (or the Alt and Shift keys) and then repeatedly pressing the Tab key. By way of another example, in the Windows™ 95 operating system, depressing and holding the Alt key (or the Alt and Shift keys) and then pressing the Tab key displays a dialog box with an icon for each of the current windows, and repeatedly pressing the Tab key allows the user to cycle through the icons displayed in the dialog box. However, these solutions also require the user to recognize the icon and/or name of the window he or she is looking for, which hinders window selection if he or she does not recognize the name or icon. Thus, it would be beneficial to provide a method to simplify locating windows in a multiple window display that does not require recognition by the user of the name and/or icon of the window.

Some of the problems which can arise in a multiple-window display of a typical graphical user interface are illustrated in FIG. 1. As illustrated in FIG. 1, six windows 101–106 are currently displayed on a display 100. Each of the windows 101–106 also includes a title bar at the top of the window which provides the name of the window. For example, window 101 has "WINDOW(1)" displayed in its title bar. However, due to overlapping windows, the names of some of the windows are not visible, such as windows 104 and 106. Additionally, due to the size of the windows, some window names may be truncated, such as window 103. Furthermore, there may be additional windows that are not visible because they are completely overlapped by another window(s). For example, multiple windows may be overlapped by window 105 and therefore not visible to the user.

FIG. 1 also shows a TaskBar 110 which includes the names of multiple windows which are available for selection by a user. However, as shown in FIG. 1, the window names are truncated, thereby making it difficult for the user to determine which name of TaskBar 110 corresponds to a specific window. This is particularly true when the windows include open "folders" and the entire path name is displayed as the title, as in the case of Windows™ 95, which can result in multiple names being truncated to the same name (for example, "C:\WIND . . . ").

As will be described in more detail below, the present invention provides a method for assisting in window selection to achieve these and other desired results which will be apparent to those skilled in the art from the description that follows.

SUMMARY OF THE INVENTION

A method for assisting window selection in a graphical user interface is described herein. Upon being activated, one or more of the current windows is displayed for selection by the user. The user is then able to select a particular window of the one or more windows being displayed.

In an embodiment of the present invention, a user is allowed to cycle through sets of one or more windows which do not overlap by more than a predetermined amount until all current top-level windows have been displayed, and then repeat the cycling. The user is able to indicate to discontinue the displaying of the sets of one or more windows at any point during the cycling. In this embodiment, windows which are not part of the set of one or more non-overlapping windows can be either hidden from view, or be translucent.

In another embodiment of the present invention, all windows which correspond to a particular one or more groups are displayed as translucent windows and all other windows are hidden from view. A user is then able to select any one of the translucent windows.

In another embodiment of the present invention, all current top-level windows are displayed as translucent windows. A user is then able to select any one of the translucent windows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a technique to assist a user in selecting a window in a graphical user interface. Upon being activated, in one embodiment, the present invention displays one or more of the current top-level windows for selection by the user. The user is then able to select a particular window of the one or more windows being displayed. In some embodiments, the present invention also allows the user to cycle through additional sets of one or more windows until all current top-level windows have been displayed, and then repeat the cycling. The user is also able to select a particular top-level window to be the active window at any point during the cycling.

Figure 1:
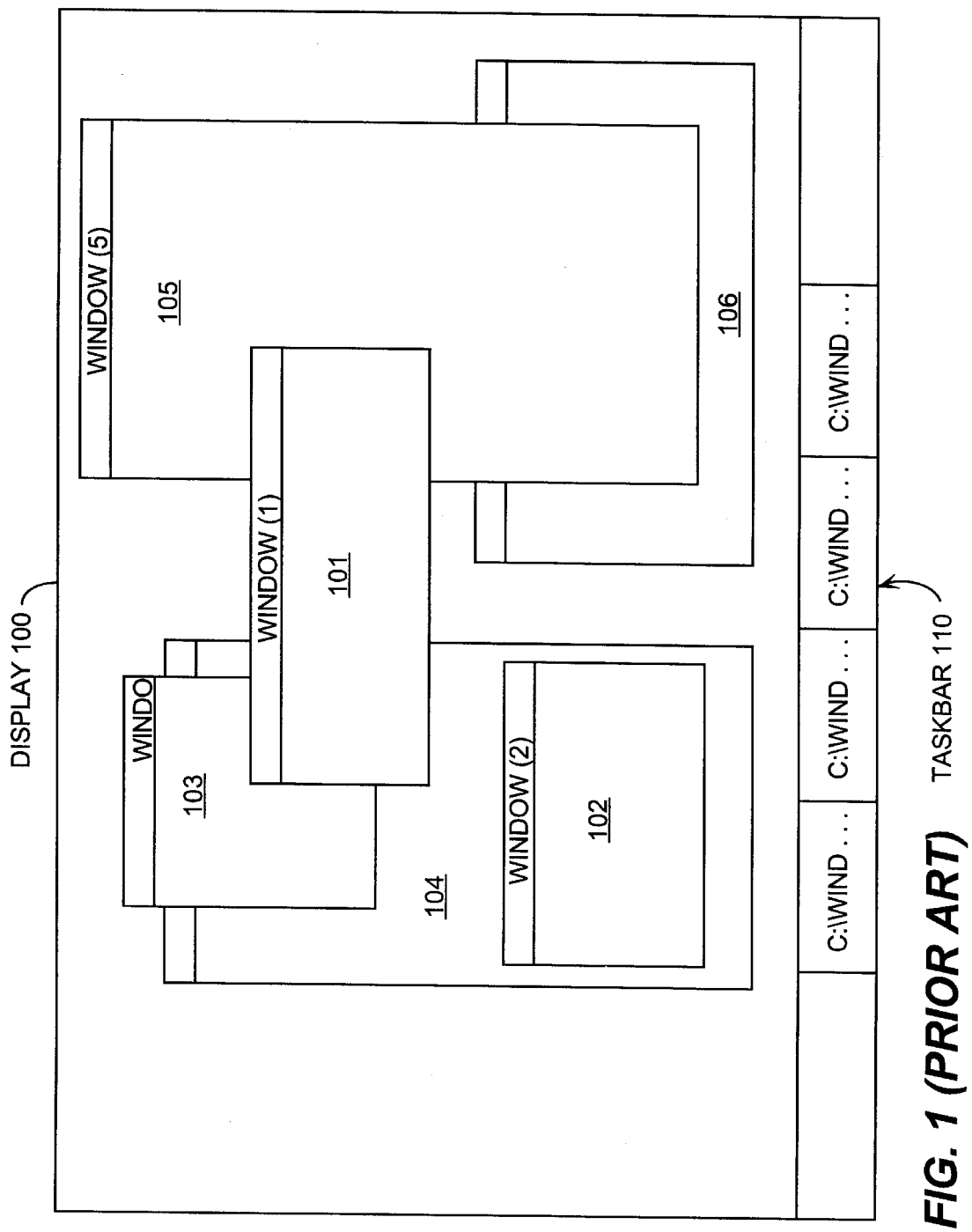
FIG. 1 illustrates a multiple-window display of a typical graphical user interface in the prior art.
Figure 2:
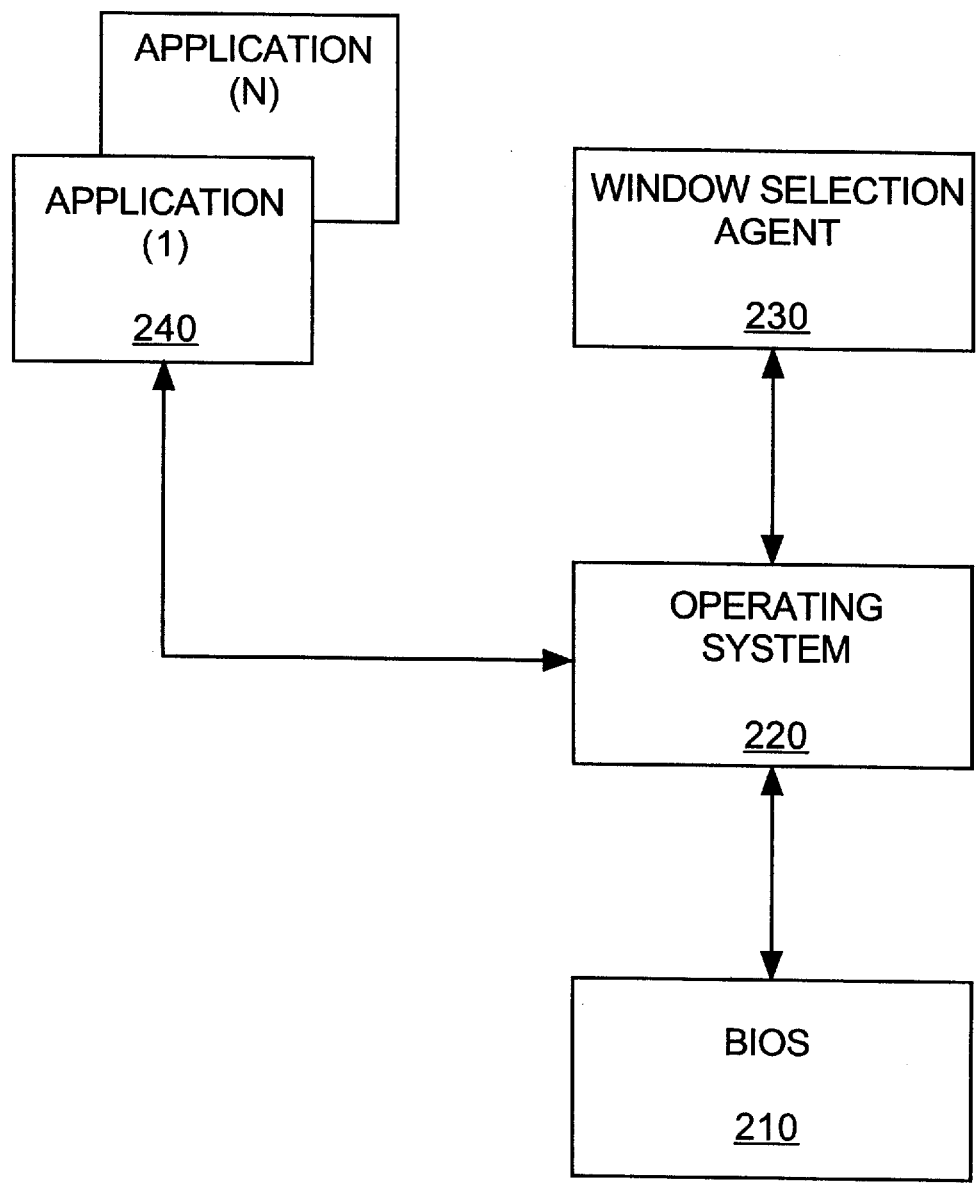
FIG. 2 is a simplified block diagram illustrating the system architecture of a computer system such as may be used with one embodiment of the present invention.

FIG. 2 is a simplified block diagram illustrating an embodiment of the system architecture of a computer system such as may be used with one embodiment of the present invention. As shown, the system includes a basic input/output system (BIOS) 210, an operating system 220, and a window selection agent 230. BIOS 210 provides an interface between the operating system 220 and the various input/output (I/O) devices coupled to the system.

Operating system 220 comprises a software application which provides an interface between BIOS 210 and software applications 240 running on the system. The operating system 220 provides a graphical user interface (GUI) to the user which displays information using portions of the display referred to as "windows". Typically, the size, shape, and location of these windows on the display may be changed by the user. According to one embodiment of the present invention, operating system 220 is the Windows™ 95 operating system, available from Microsoft Corporation of Redmond, Washington. However, it is to be appreciated that the present invention may be used with any other conventional operating system which supports windows, such as other versions of Microsoft Windows™ (for example, Windows™ 3.0, Windows™ 3.1, or X-Windows), OS/2, available from International Business Machines Corporation of Armonk, N.Y., or the Apple Macintosh Operating System, available from Apple Computer Incorporated of Cupertino, Calif.

In some operating systems which can be used with the present invention, only one window may be "active" at any one time, and all other windows are "inactive". The active window refers to the window which can receive user input (for example, input typed in via a keyboard). It is to be appreciated that multiple windows can be displayed concurrently, even though only one is the active window.

In one embodiment of the present invention, the window selection agent 230 provides the window selection assistance functions of the present invention. The window selection agent 230 interacts with the operating system 220 to advantageously provide an improved method for assisting a user in selecting a window as discussed in more detail below.

According to one embodiment of the present invention, the operating system 220 maintains a record of the current windows in the system, including "top-level" windows. The current windows are those which correspond to currently executing applications as well as currently open folders, including both windows which are open and windows which are minimized. As is known to those skilled in the art, operating systems such as Windows™ 95 support both parent and child windows. A window which is opened from an executing application is the child of that application's window, which in turn is the parent of the newly opened window. Top-level windows refer to those windows which are opened from the desktop window, such as applications being executed or folders being opened. A document window within an application, or a message box within an application are not considered top-level windows.

The current top-level windows being displayed are the open windows (whether or not currently visible to a user), as well as windows which are minimized, such as those which do not have an open window but have an icon and/or name in the Windows™ 95 TaskBar. The record of current windows maintained by operating system 220 is accessible to applications operating on the computer system, including window selection agent 230. In embodiments using a Microsoft Windows™ operating system, window selection agent 230 may access the record of current top-level windows using GetWindow and GetNextWindow procedure calls. Alternatively, window selection agent 230 may access the record of current windows using the EnumWindows procedure call, which identifies the current top-level windows. The GetWindow, GetNextWindow, and EnumWindows procedure calls are well-known to those skilled in the art and thus will not be discussed further, except as they relate to the present invention.

Each of the current windows, including the top-level windows, includes a "handle", which is an identifier that may be used by an application, including window selection agent 230, to identify a particular window to the operating system 220. Additionally, window selection agent 230 may determine the size and position of each of the current top-level windows using the GetWindowRect procedure call. This procedure call is well-known to those skilled in the art and thus will not be discussed further, except as it relates to the present invention.

Given the size and the location of each of the current top-level windows, window selection agent 230 may determine in any of a wide variety of conventional manners whether any two or more particular windows overlap by more than a predetermined amount, such as a predetermined percentage of one window overlapping the other. In one embodiment, this predetermined amount can be changed by a user via a user preferences setting (e.g., a menu option), and may range from 0% to 100%.

Window selection agent 230 advantageously provides an enhanced method for locating a particular window, as discussed in more detail below. When window selection agent 230 identifies a window which is to be the new active window, window selection agent 230 indicates to operating system 220 to switch the active window to that particular window. In embodiments where operating system 220 is a Microsoft Windows™ operating system, window selection agent 230 makes this indication using the SetActiveWindow procedure call. The SetActiveWindow procedure call is well-known to those skilled in the art and thus will not be discussed further, except as it pertains to the present invention.

In the discussions to follow, reference is made to "translucent" windows. A translucent window is a window displayed to be visible yet also show any windows on top of it and behind it. If two translucent windows overlap, then the overlapping portions of both windows are displayed together. Thus, windows below a translucent window(s) which would otherwise be hidden can be seen through the translucent window(s). This translucent effect may be further enhanced in any of a wide variety of conventional manners, such as by changing the color of the translucent window(s) to gray, changing the intensity of the color(s) of the translucent window(s), making text italicized, etc. Additionally, it is to be appreciated that although translucent windows are discussed herein, the present invention may use any other method which serves to visibly distinguish the windows discussed as translucent from the windows discussed as non-translucent.

Certain embodiments of the present invention, as discussed in more detail below, can change the display to show some or all of the windows as translucent windows. In one implementation, this is accomplished by the selection agent 230 maintaining a record of "snapshots" of the various top-level windows when they are displayed. A snapshot of a window refers to a copy of the window as it is displayed on a display device of a system at a particular point in time. In one implementation, a snapshot is taken by copying the data corresponding to the window from a visual display buffer (typically referred to as the frame buffer).

Selection agent 230 can modify the display pixels of the recorded snapshots and make any of the windows it desires translucent. Selection agent 230 maintains this record of snapshots by taking a snapshot of the currently active top-level window each time a top-level window is made inactive by operating system 220. By maintaining this record, selection agent 230 is able to provide a display for windows which are not currently being displayed, such as minimized, partially hidden, or completely hidden windows.

According to one embodiment of the present invention, selection agent 230 monitors messages from operating system 220 to identify when a window is made inactive. The Windows™ 95 operating system provides information and data to executing application processes by using a messaging system. Control information, such as information indicating the window of the executing process is about to be activated or deactivated, and data, such as mouse or keyboard inputs, are indicated to an application process by sending a message to the corresponding window of the process. Messaging within the Windows™ operating system environment is well-known to those skilled in the art, and thus will not be discussed further except as it pertains to the present invention.

According to one implementation, selection agent 230 monitors the messages that are issued by the operating system 220 and looks for a WM_Deactivate message being sent to any top-level window. The WM_Deactivate message is sent to a particular window by operating system 220 just prior to the window being made inactive. Selection agent 230, upon observing a WM_Deactivate message, intercepts the WM_Deactivate message. Selection agent 230 then takes a snapshot of the window being deactivated, stores the snapshot, and then passes on the WM_Deactivate message to the window being made inactive.

In alternate embodiments, additional messages are monitored either in addition to or in place of the WM_Deactivate message. These messages may include, for example, WM_Minimize, WM_Maximize, WM_Restore, and WM_Activate. The WM_Minimize message is sent to a window by the operating system to minimize the window to the TaskBar. The WM_Maximize message is sent to a window by the operating system to expand the window to the full display size. The WM_Restore message is sent to a window by the operating system to restore the window to its previous size prior to being minimized to the TaskBar. The WM_Activate message is sent to a window by the operating system to make the window an active window.

Figure 3:
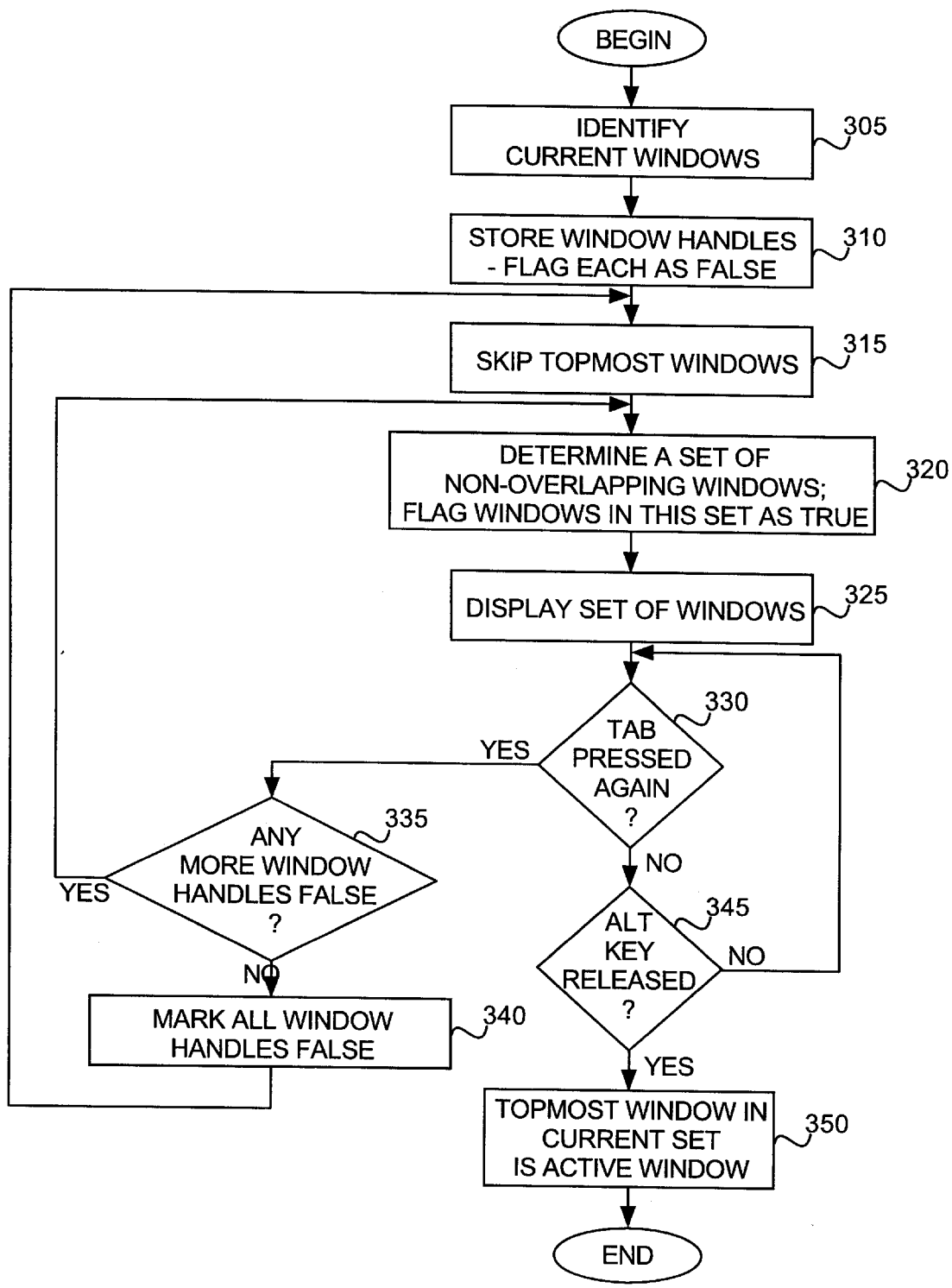
FIG. 3 is a flowchart illustrating the steps followed to assist in window selection according to one embodiment of the present invention.

FIG. 3 is a flowchart illustrating the steps followed to assist in window selection according to one embodiment of the present invention. In this embodiment, the operating system initiates execution of the window selection agent upon receipt of a particular indicator, such as the Alt-Tab key sequence. This key sequence allows a system user to indicate to the system when he or she wishes to invoke the executed embodiment of the window selection assistance methods in accordance with the present invention. Upon beginning, the window selection agent obtains a listing or other indication of all current top-level windows on the display, step 305. As discussed above, this may be done using the GetWindow and GetNextWindow procedure calls or the EnumWindows procedure call, for example, although the present invention is not limited in scope in this respect. Upon obtaining a listing of the current top-level windows, the selection agent stores the window handles of all of the windows along with a flag value indicating "false", step 310. The "false" flag value indicates that the window has not been displayed yet by the selection agent, as discussed below.

The selection agent then skips the topmost window if the topmost window is a top-level window, step 315. In one implementation, this is done by setting the flag value for the topmost window to true. In this embodiment, the selection agent skips the topmost window because it presumes that if the user were interested in selecting the topmost window, which was the active window when the window selection agent was activated, then the user would not have activated the window selection agent because that window is already active. In alternate embodiments, the skipping step 315 is not included, and the selection agent flows from step 310 directly to step 320.

The window selection agent then determines a set of one or more windows with a flag value of false that do not overlap by more than a predetermined amount and changes the flag value for each of the windows in this set to true, step 320. In one embodiment, the present invention determines the set of windows by going through the list of windows received from the operating system and checking for windows with a flag value of false which do not overlap by more than a predetermined amount. In one implementation, this is done as an in-order search, based on topmost to bottom-most window. This is also referred to as going through the windows according to their Z-order. The topmost window with a flag value of false is added to the set, and then the list of windows is searched through, in order, for the next window with a flag value of false that can be added to the set without overlapping a window already in the set by more than a predetermined amount. It is to be appreciated, however, that any of a wide variety of search algorithms can be used to determine the set. For example, a best-fit search algorithm could be used which attempts to add as many windows as possible to the set.

Once, the set is determined, the selection agent displays the set of windows, step 325. In one embodiment of the present invention, the selection agent displays the set of windows normally, and displays the other windows as translucent windows or alternatively hides the other windows.

The window selection agent then checks whether the Tab key is pressed again, step 330. If the Tab key is pressed again, then the selection agent checks whether there are any more window handles with a flag value of false, step 335. If there are additional window handles with a flag value of false, then the selection agent returns to step 320 and determines another set of windows which do not overlap by more than a predetermined amount. However, if there are no additional window handles with a flag value of false, then the selection agent marks all of the window handles false, step 340, and returns to step 315 to repeat the above process. Alternatively, the selection agent could return to step 320 rather than step 315.

Returning to step 330, if the Tab key is not pressed again, then the selection agent checks whether the Alt key is released, step 345. If the Alt key is not released, then the selection agent returns to step 330, thereby continually checking for activation of the Tab key or release of the Alt key, steps 330 and 345. However, if the Alt key is released in step 345, thereby indicating in this particular embodiment to discontinue the displaying of windows in sets, then the topmost window in the currently displayed set is made the active window, step 350. Alternatively, the user may be presented with a list of the windows in the currently displayed set and asked to select one to become the current active window. Execution of the window selection agent is then complete, until the Alt-Tab key sequence is selected again for this embodiment.

According to one embodiment of the present invention, upon selection of a particular window the Z-ordering of the windows is maintained as it was prior to invoking the selection agent, except that the newly selected window is the top-most window.

In one particular embodiment of the present invention, when the list of current top-level windows is being obtained in step 305, the selection agent includes those windows that are minimized (such as those listed in the Windows™ 95 TaskBar). These windows are then expanded when the set of windows is determined and displayed in steps 320 and 325, thereby providing the user with the graphical display of all current top-level windows in expanded form, as opposed to any windows being minimized.

It is to be appreciated that although the above description discusses using a flag value to indicate whether a particular window has been determined to be and displayed as part of a set, this indicating can be done in any of a wide variety of conventional manners. For example, in an alternative embodiment, the present invention could alternatively maintain two lists of handles, one list providing the handles of windows that have been determined to be and displayed as part of a set, and the second list providing the handles of those windows that have not been determined to be and displayed as part of a set.

Figure 4:
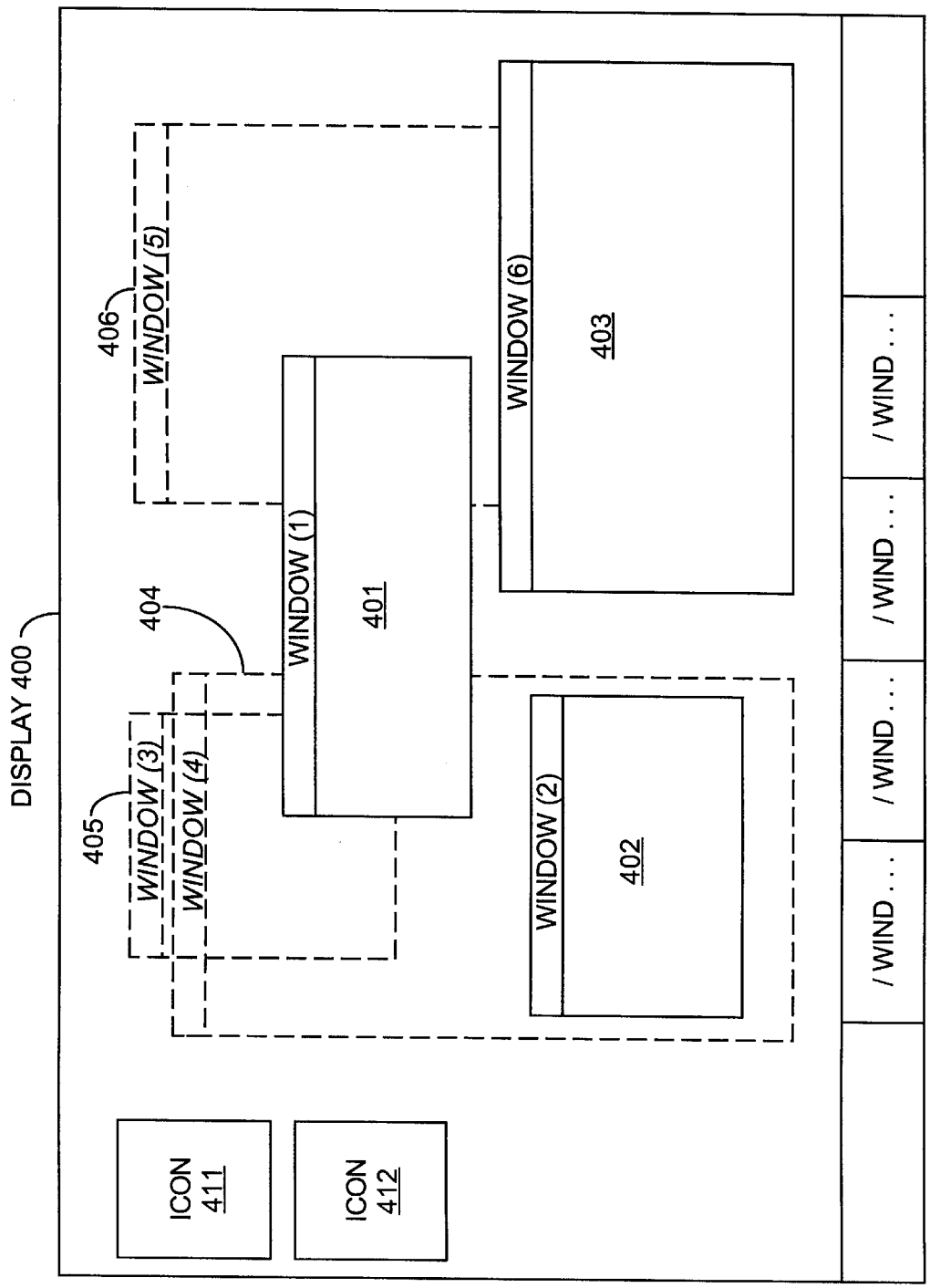
FIG. 4 illustrates an example display of one step of the window selection process of FIG. 3.

FIG. 4 illustrates an example display of one step of the window selection process as discussed above with reference to FIG. 3. Display 400 shows six windows 401–406 and two icons 411 and 412. The windows 401, 402, and 403 are the windows in the current set, as determined in step 320 of FIG. 3. The remaining windows 404, 405, and 406 are shown as translucent windows. Thus, the user can clearly see the non-overlapping windows in the current set, as well as part of the other windows.

In an alternate embodiment, windows 404, 405, and 406 are completely hidden rather than being translucent.

Figure 5:
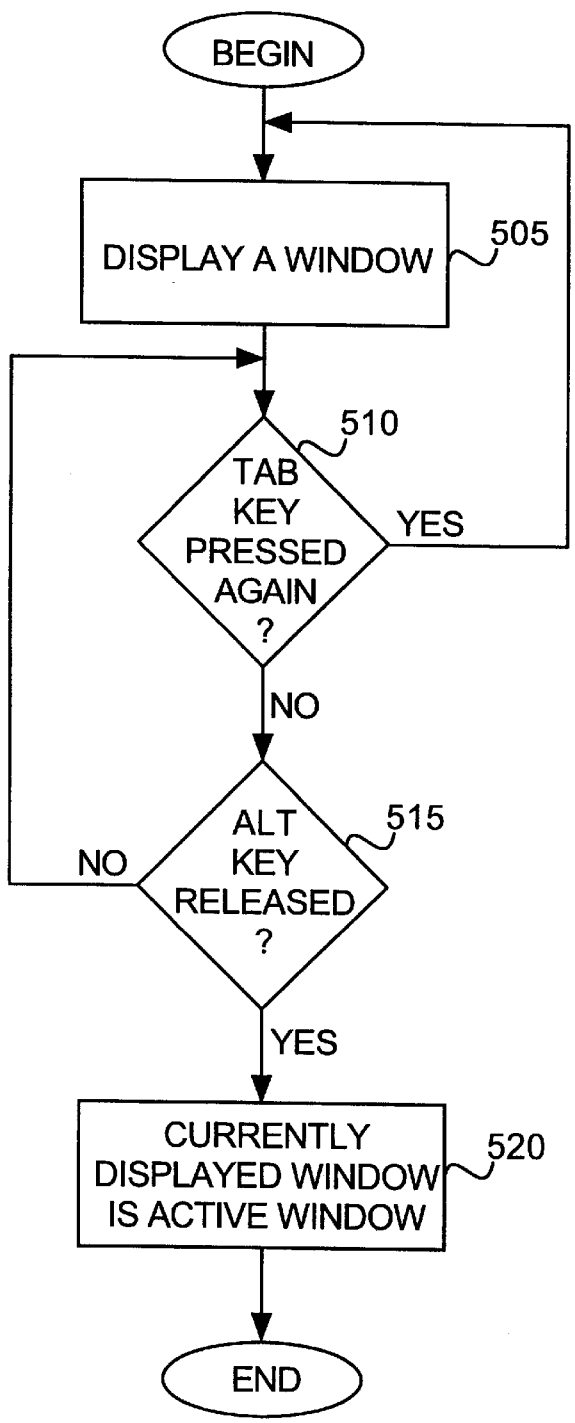
FIG. 5 is a flowchart illustrating the steps followed to assist in window selection according to another embodiment of the present invention.

FIG. 5 is a flowchart illustrating the steps followed to assist in window selection according to another embodiment of the present invention. Upon activation of the window selection agent via the Alt-Tab key sequence, the agent displays one of the current top-level windows, step 505. In the illustrated embodiment, the window to be displayed is the second topmost window if the topmost window is a top-level window because in this embodiment of the present invention assumes the window selection agent would not have been activated if the topmost window, which was the active window at the time the window selection agent was activated, is the window the user is looking for. The selection agent then checks whether the Tab key is pressed again, step 510. If the Tab key is pressed again, then the selection agent returns to step 505 to display another window. In the illustrated embodiment, this is the next topmost window.

If the Tab key is not pressed, then the selection agent checks whether the Alt key is released, step 515. If the Alt key is not released, then the selection agent returns to step 510, thereby continually checking whether the Tab key is pressed again or the Alt key is released. However, if the Alt key is released in step 515, thereby indicating to discontinue the displaying of windows individually, then the selection agent makes the currently displayed window the active window, step 520.

In the embodiment illustrated in FIG. 5, when a window is displayed in step 505, it is to be appreciated that the other current top-level windows may be either made translucent or may be hidden.

In the illustrated embodiment of the present invention, each of the current top-level windows is initially flagged as false to indicate it has not been displayed yet, and then flagged as true when it has been displayed, analogous to the discussion above regarding FIG. 3. Then, once all windows have been displayed, all flag values are again set to false. This process is continued until the Alt key is released. It is to be appreciated that the designation of false/true is merely a convention and that other logical designators may be employed.

Thus, the embodiment of FIG. 5 displays windows one at a time for selection rather than displaying a group of windows at a time.

Figure 6:
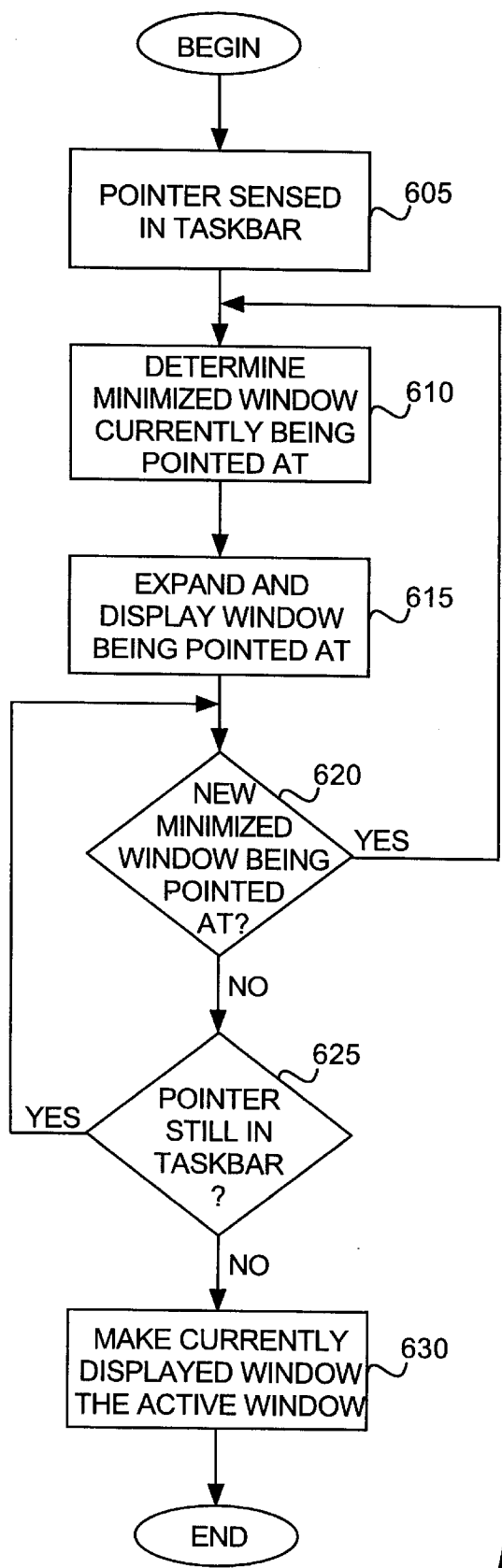
FIG. 6 is a flowchart illustrating the steps followed to assist in window selection according to another embodiment of the present invention.

FIG. 6 is a flowchart illustrating the steps followed to assist in window selection according to another embodiment of the present invention. In this embodiment, the window selection agent is activated when a pointer or other cursor device is sensed in the TaskBar area, step 605. In one implementation, this sensing is done by the selection agent requesting the location of the TaskBar from the operating system and then continually monitoring the location of the cursor. When the selection agent identifies the cursor location overlapping the TaskBar, the selection agent detects that the TaskBar is being pointed to.

Once the pointer is sensed in the TaskBar, the selection agent determines the minimized window currently being pointed to, step 610. In one implementation, each icon and/or name in the Windows™ 95 TaskBar corresponding to a current top-level window is also itself a window. Each of these icon and/or name windows comprises the minimized version of a window. Thus, by knowing the location of the minimized windows, the window selection agent may readily identify when a particular minimized window is being pointed to, and then expand that window.

The selection agent then displays the window being pointed to in expanded form, step 615. Additionally, in step 615, the remaining windows, but not the TaskBar, are made either translucent, or, alternatively, are hidden.

The selection agent then checks whether a new minimized window is being pointed to, step 620. If a new minimized window is being pointed to, then the selection agent returns to step 610 to determine and display the new window in expanded form. If a new minimized window is not being pointed to, then the selection agent checks whether the pointer is still in the TaskBar, step 625. If the pointer is still in the TaskBar, then the selection agent returns to step 620. However, if the pointer is no longer in the TaskBar, then the selection agent makes the window currently being displayed the active window, step 630. The remaining windows are then reordered, if necessary, by the operating system after making the currently displayed window the active window.

Figure 7:
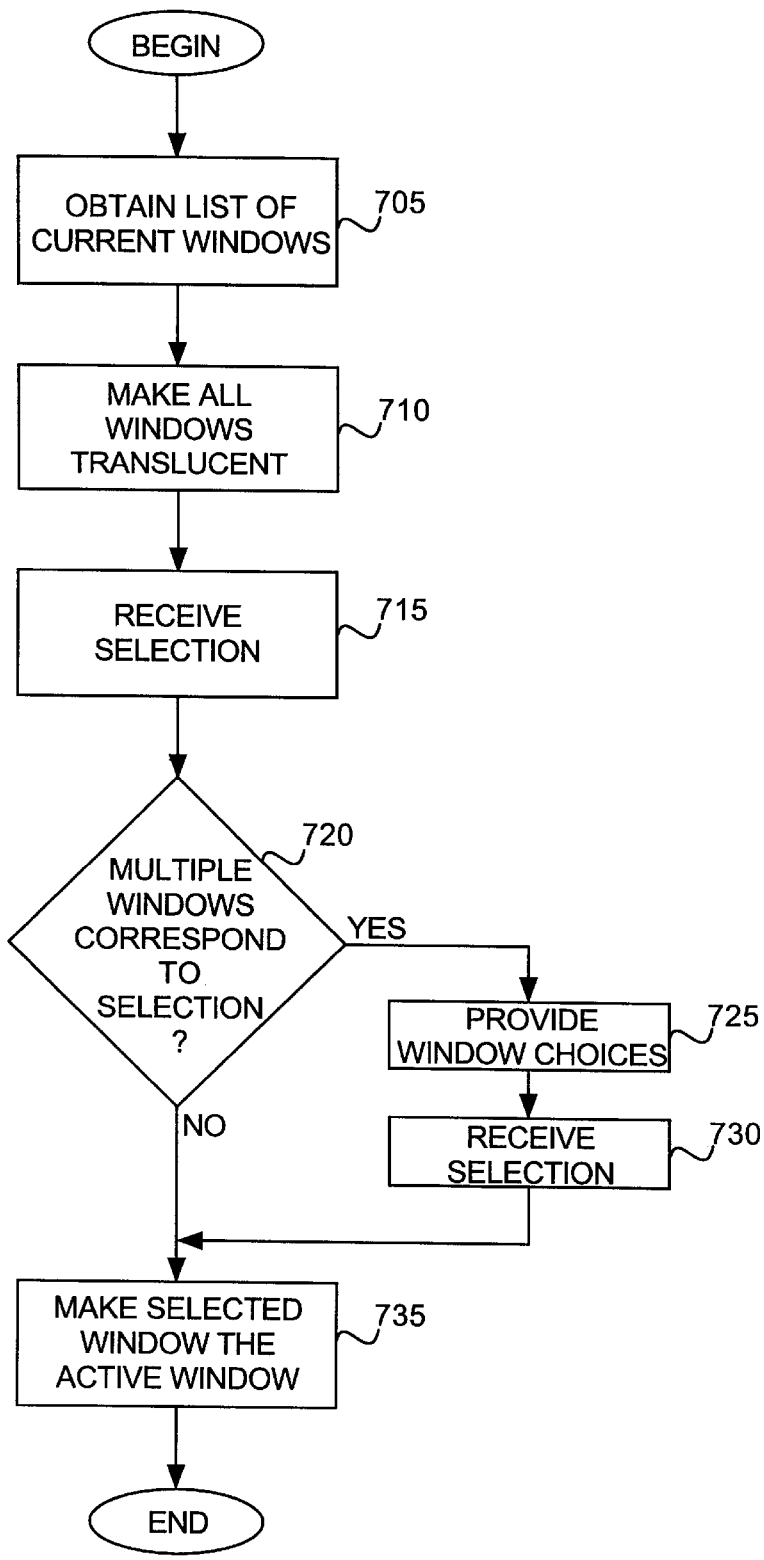
FIG. 7 is a flowchart illustrating the steps followed to assist in window selection according to another embodiment of the present invention.

FIG. 7 is a flowchart illustrating the steps followed to assist in window selection according to another embodiment of the present invention. Upon activation of the window selection agent, the selection agent obtains a list of the current top-level windows, step 705. The selection agent then makes all of the current top-level windows translucent, step 710. In one implementation, minimized windows are expanded and also displayed in step 710.

The selection agent then receives a selection from a user, step 715. In one embodiment, this selection is made by the user positioning a pointer at a particular location on the screen on top of the window he or she wishes to select and "clicking" a mouse button. Given that all of the current top-level windows are translucent, it is possible that multiple translucent windows may overlap the same location. Thus, it is possible that the selection of a single display location may result in multiple windows corresponding to the selection. Thus, the selection agent determines whether multiple windows correspond to the selection, step 720.

If multiple windows do not correspond to the selection, then the selected window is the active window, step 735. However, if multiple windows do correspond to the selection, then the selection agent provides a choice of windows, step 725. In one implementation, this choice of windows is provided by displaying a menu box listing each of the windows which corresponds to the selection, and allowing the user to select one of those windows. The selection agent then receives the selection from the user, step 730, and the selected window is made the active window, step 735.

Figure 8:
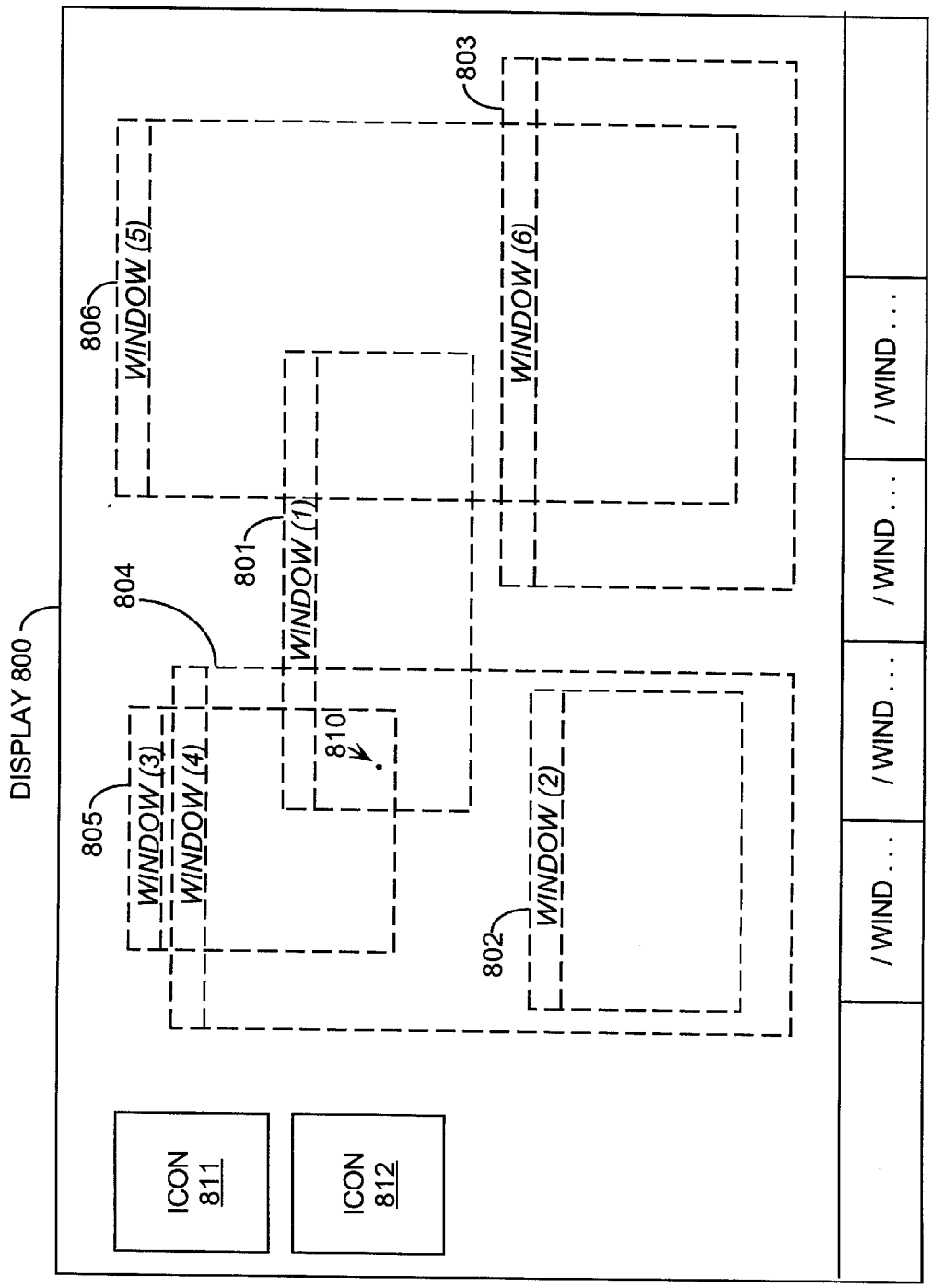
FIG. 8 illustrates an example display of one step of the window selection process of FIG. 7.

FIG. 8 illustrates an example display of one step of the window selection process as discussed above with reference to FIG. 7. The display 800 shows six windows 801–806 as translucent windows and two icons 811 and 812. FIG. 8 also illustrates an example where multiple windows may correspond to a single selection. For example, if the user were to select the point 810, then the selection could be for window 801, window 804, or window 805. Thus, the window selection agent would provide windows 801, 804 and 805 as the choices in step 725.

Figure 9:
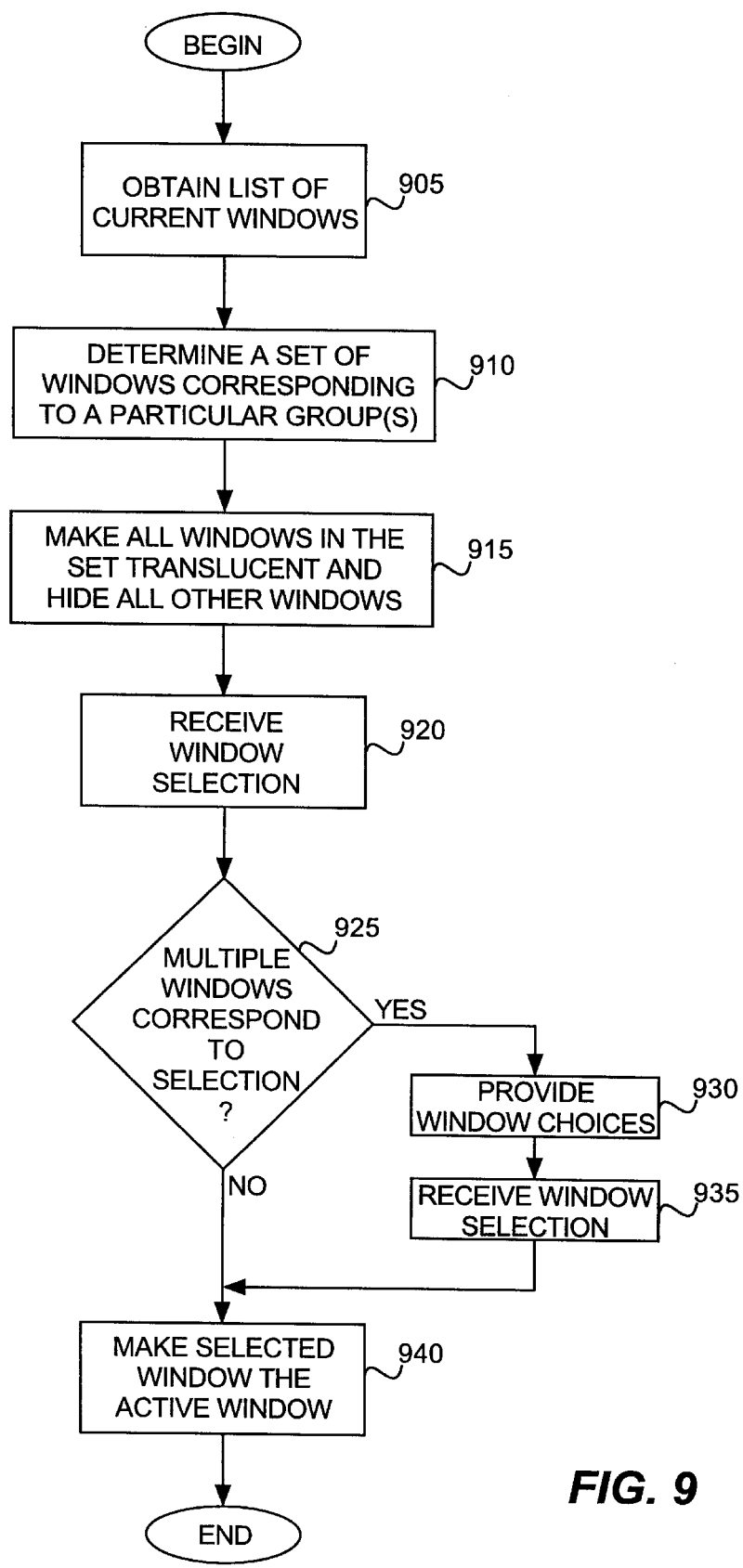
FIG. 9 is a flowchart illustrating the steps followed to assist in window selection according to another embodiment of the present invention.

FIG. 9 is a flowchart illustrating the steps followed to assist in window selection according to another embodiment of the present invention. Upon activation of the window selection agent, the selection agent obtains a list of the current top-level windows, step 905. The selection agent then determines a set of windows that correspond to a particular group, step 910. In one implementation, when the selection agent receives the window handles from the operating system it also receives an indication of the parent applications of the windows. The parent application of a window refers to the application being executed which generated the window. For example, if a word processing application is executed from a ProShare™ Personal Conferencing application, then the ProShare™ Personal Conferencing application is the parent application of the windows of the word processing application. For each window, the window's parent is compared with one or more predetermined groups, and if the parent is part of the one or more groups, then that window is included in the set in step 910. For example, the parent of some of the current top-level windows may be a ProShare™ Personal Conferencing application, and the predetermined group may include the ProShare™ Personal Conferencing application.

It is to be appreciated that the groups may be defined in any of a wide variety of conventional manners. For example, groups may be coded into the window selection agent. By way of another example, in an embodiment users may be able to select and modify the groups via a user preferences profile associated with the window selection agent.

Once the set of windows is determined in this particular embodiment, the selection agent makes all windows in the set translucent and hides all other windows, step 915. Thus, all windows corresponding to the group are translucent, and all other windows are hidden from view in this embodiment. The selection agent then receives a window selection from a user, step 920.

Given that all of the windows in the set being displayed are translucent, it is possible that multiple windows can correspond to the selection. Therefore, analogous to the discussion above with reference to FIG. 7, the selection agent checks whether multiple windows correspond to the selection, step 925. If multiple windows do not correspond to the selection, then the selected window is made the active window, step 940. However, if multiple windows do correspond to the selection, then the selection agent provides a set of window choices, step 930. The selection agent receives a window selection by the user from these choices, step 935, and proceeds to make the selected window the active window, step 940.

In the discussions above, the window selection agent is described as being activated in response to the Alt-Tab key sequence. However, it is to be appreciated that the window selection agent can be activated in any of a wide variety of conventional manners. For example, the window selection agent can be activated by a different key sequence, by choosing a particular screen location (such as by clicking a mouse button when a pointer is over a particular "button" on the screen), by choosing a menu item, by providing an input signal from a command line (for example, an input signal from a DOS window), by positioning a pointer over the TaskBar, etc.

In the discussions above, the window selection agent is also described as assisting window selection of top-level windows. It is to be appreciated, however, that other classes or levels of windows, or combinations thereof, may be used within the spirit and scope of the present invention.

Figure 10:
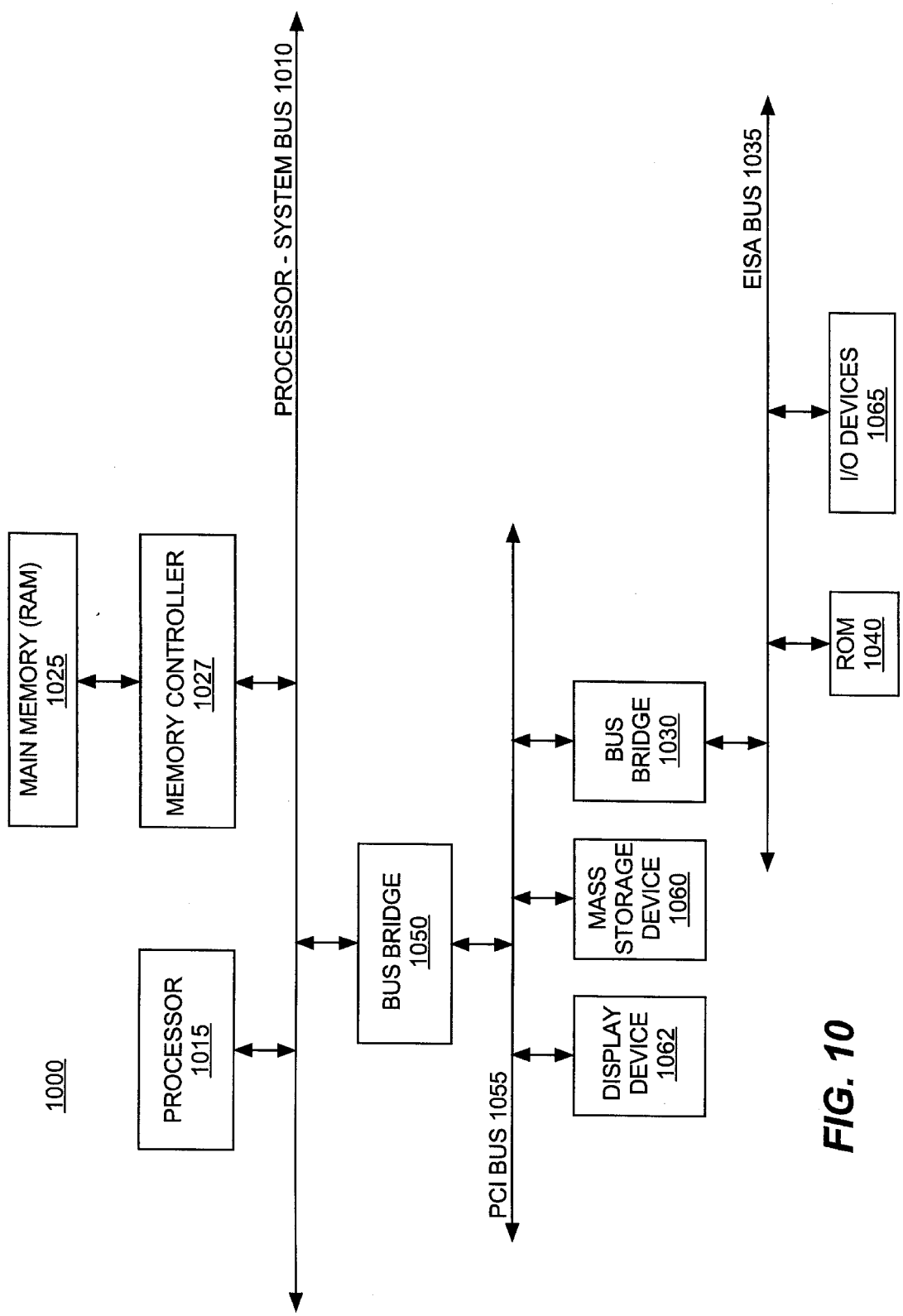
FIG. 10 is a block diagram of a computer system such as may be used with one embodiment of the present invention.

FIG. 10 is a block diagram of a computer system such as may be used with one embodiment of the present invention. Computer system 1000 is shown comprising a processor-system bus or other communication device 1010 for communicating information to and from processor 1015. Processor 1015 is for processing information and instructions. In one implementation, the present invention includes an Intel® architecture microprocessor as processor 1015; however, the present invention may utilize any type of microprocessor architecture. In one embodiment, processor bus 1010 includes address, data and control buses. System 1000 also includes a random access memory (RAM) 1025 and memory controller 1027 coupled with processor bus 1010 for storing information and instructions for processor 1015.

A bridge 1050 is also coupled to processor bus 1010 for coupling processor bus 1010 to one or more additional, typically I/O, buses. In one embodiment, this bus is a Peripheral Component Interconnect (PCI) bus 1055. PCI bus bridge 1050 couples processor bus 1010 to PCI bus 1055. A display device 1062 is coupled to PCI bus 1055 for displaying information to the computer user. Display device 1062 may be a liquid crystal device, cathode ray tube, or other display device suitable for creating graphic images and alphanumeric characters (and ideographic character sets) recognizable to the user. Additionally, a mass storage device 1060 such as a magnetic or optical disk and disk drive is coupled with PCI bus 1055 for storing information and instructions for processor 1015.

In one embodiment, PCI bus 1055 is also coupled to an Extended Industry Standard Architecture (EISA) bus 1035 via an EISA bus bridge 1030. A read only memory (ROM) 1040 is coupled with EISA bus 1035 for storing static information and instructions for processor 1015. I/O devices 1065 are also coupled to EISA bus 1035 which input and output data and control information signals to and from processor 1015, and possibly other devices in system 1000. I/O devices 1065 can include, for example, an alphanumeric input device including alphanumeric and function keys, and a cursor control device such as a mouse, trackball, trackpad, etc. A hard copy device such as a plotter or printer may also be included in I/O devices 1065 for providing a visual representation of computer images, or a network adapter device may be included in I/O devices 1065 for coupling system 1000 to a computer network.

It is to be appreciated that certain implementations of system 1000 may include additional processors or other components, such as additional PCI buses and bus bridges. Furthermore, certain implementations of the present invention may not require nor include all of the above components. For example, system 1000 may not include display device 1062. Alternatively, system 1000 may not include an EISA bus 1035 and EISA bus bridge 1030.

In one embodiment of the present invention, the windows selection agent discussed above is implemented as a series of software routines run by the computer system of FIG. 10. These software routines comprise a plurality or series of instructions to be executed by a processor in a computer system, such as processor 1015 of FIG. 10. Initially, the series of instructions are stored on a storage device, such as mass storage device 1060. When the window selection agent is invoked, or alternatively when the operating system is loaded into memory 1025, the instructions are copied from storage device 1060 into memory 1025, and then accessed and executed by processor 1015. In one implementation, these software routines are written in the C++ programming language. It is to be appreciated, however, that these routines may be implemented in any of a wide variety of programming languages. In an alternate embodiment, the present invention is implemented in discrete hardware or firmware.

Thus, embodiments in accordance with the present invention provide a method for assisting window selection. Embodiments in accordance with the present invention advantageously display entire windows rather than only icons and/or names, thereby providing additional visual information regarding the current top-level windows to the user and assisting him or her in selecting a window. Embodiments in accordance with the present invention allow a user to select a particular window by actually seeing the window, and does not limit the user to an icon and/or name only selection process.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method for assisting window selection in a graphical user interface has been described.

What is claimed is:

1. A method of assisting selection of a window in a graphical user interface comprising:
    (a) displaying a plurality of windows;
    (b) determining, within the plurality of windows, multiple sets of multiple windows, wherein each window within a set of windows partially overlaps other windows in the set of windows by less than a predetermined amount, further wherein the window sizes are maintained; and
    (c) designating an active set of windows from the multiple sets of windows, wherein the active set of windows is visually distinct from the remaining sets of windows, further wherein the active set of windows is selectable by the user.

2. The method of claim 1 further comprising:
    (d) changing the active set of windows to a second set of windows from the multiple sets of windows in response to a user generated input, wherein the second set of windows includes multiple windows of the plurality of windows which are not in a previous set of active windows; and
    (e) repeating (a) through (d) until a window in the active set of windows is selected by a user.

3. The method of claim 1 wherein the multiple sets of windows that are not the active set of windows are displayed as translucent.

4. The method of claim 1 wherein the multiple sets of windows that are not the active set of windows are hidden.

5. A computer-readable medium having stored thereon sequences of instructions, which when executed by a processor cause the processor to:
    (a) display a plurality of windows;
    (b) determine, within the plurality of windows, multiple sets of multiple windows, wherein each window within a set of windows partially overlaps other windows in the set of windows by less than a predetermined amount, further wherein the window sizes are maintained; and
    (c) designate an active set of windows from the multiple sets of windows, wherein the active set of windows is visually distinct from the remaining sets of windows, further wherein the active set of windows is selectable by the user.

6. The computer-readable medium of claim 5, wherein the sequences of instructions further comprise sequences of instructions that cause the processor to:
    (d) changing the active set of windows to a second set of windows from the multiple sets of windows in response to a user generated input, wherein the second set of windows includes multiple windows of the plurality of windows which are not in a previous set of active windows; and
    (e) repeating (a) through (d) until a window in the active set of windows is selected by a user.

7. The computer-readable medium of claim 5 wherein the multiple sets of windows that are not the active set of windows are displayed as translucent.

8. The computer-readable medium of claim 5 wherein the multiple sets of windows that are not the active set of windows are hidden.

9. An apparatus comprising:
    a bus;
    a memory device coupled to the bus, the memory device to store one or more programs that cause a plurality of windows to be displayed on a display device; and
    a processor coupled to the bus, the processor to execute the one or more programs to display the plurality of windows on the display device, the processor to determine multiple sets of windows from the plurality of windows, wherein each window within a set of windows partially overlaps other windows in the set of windows by less than a predetermined amount wherein window sizes are maintained, the processor further to designate an active set of windows from the multiple sets of windows and to display the active set of windows as visually distinct from the other sets of windows.

10. The apparatus of claim 9 wherein the processor changes the active set of windows to a second set of windows from the multiple sets of windows in response to a user generated input, wherein the second set of windows includes multiple windows from the plurality of windows which are not in the previous set of active windows.

11. The apparatus of claim 9, wherein the processor causes the windows that are not in the active set of windows to be displayed as translucent.

12. The apparatus of claim 9, wherein the processor causes the windows that are not in the active set of windows to be hidden.

* * * * *